3,186,964
PAINTABLE RELEASE AGENTS

Gust J. Kookootsedes and John L. Speier, Midland, Mich., assignors to Dow Corning Corporation, Midland, Mich., a corporation of Michigan
No Drawing. Filed Dec. 1, 1961, Ser. No. 156,466
5 Claims. (Cl. 260—46.5)

This invention relates to new compositions suitable for use as mold release agents which do not cause "fisheyeing" of paint on surfaces where a minute amount of the release agent was present during painting.

Siloxanes and siloxane-containing materials have been employed for some years as mold-release agents for various materials, such as rubber and plastics. These release agents do an excellent job of releasing many materials for molds. However, these release agents possess one very undessirable characteristic in that they cause non-wetting of paint on surfaces when present during painting. This results in "fisheyes" or small unpainted areas in the painted surface. These "fisheyes" occurred in spite of the very small quantities of release agent used.

Not only did these "fisheyes" occur when these molded articles were painted, but it also often occurred when surfaces of materials in proximity to the molded article were painted. Non-wetting of the surfaces of these materials is thought to occur because of either migration of the silicone contaminant from the molded article to the adjoining material or air-borne silicone contamination. Since the release agents are often sprayed onto the mold surface, there is often air-borne silicone contamination which produces "fisheyes" in materials with which it comes into contact. In many instances, fabricators were forced to switch to poorer release agents because of the seriousness of this problem. Applicants have discovered a release agent which solves the paintability problem and is also an excellent release agent.

It is an object to this invention to provide a mold release agent which does not cause "fisheyes" in paint when minute amounts of the release agent are present during painting. Other objects and advantages will be apparent from the following description.

This invention relates to a composition consisting essentially of a toluene soluble copolymer of (1) from 10 to 90 mol percent polymeric units of the formula $(C_6H_5R\text{—})(CH_3)SiO$, wherein R is an alkylene radical of from 2 to 3 inclusive carbon atoms, and (2) from 10 to 90 mol percent polymeric units of the formula

wherein R' is an alkyl radical of from 2 to 3 inclusive carbon atoms.

Copolymers that are not toluene soluble are not satisfactory as release agents because they are difficult to use and do a poor job of releasing materials from molds.

From 10 to 90 mol percent of the copolymer is composed of $(C_6H_5R\text{—})(CH_3)SiO$ polymeric units. R is an alkylene radical of from 2 to 3 inclusive carbon atoms. Specific examples of R are —CH(CH$_3$)—, —CH$_2$CH$_2$—, —CH$_2$CH$_2$CH$_2$— and —CH(CH$_3$)CH$_2$— radicals. Preferably R is —CH(CH$_3$)CH$_2$—.

From 10 to 90 mol percent of the copolymer is composed of

polymeric units. R' is an alkyl radical of from 2 to 3 inclusive carbon atoms. Specific examples of R' are ethyl and propyl. Some of the R' radicals can be ethyl and some propyl. Preferably R is ethyl.

Small amounts of uncondensed silicon-bonded hydroxyl radicals or unhydrolyzed silicon-bonded halogen or alkoxy radicals can be present in the defined copolymers as is conventional in organosiloxanes. Preferably the copolymer is endblocked with tri-organosilyl units such as triethylsilyl, phenyldimethylsilyl, diphenylmethylsilyl, dimethyl-β-phenylpropylsilyl and trimethylsilyl units, and the hydroxyl and alkoxy content is extremely low.

The preferred method for preparing the copolymers containing

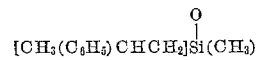

units is to first effect a reaction between α-methylstyrene and some of the silicon bonded hydrogen atoms in methylhydrogen siloxane. The mol percent of

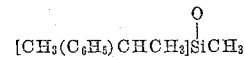

units in the copolymer is controlled by the relative amounts of reactants used in this reaction. Depending upon the copolymers desired, from .1 to .9 mol. of α-methylstyrene per mol of methylhydrogensiloxane is used. This reaction is best carried out in the presence of chloroplatinic acid as the catalyst, and the reaction is an addition reaction which results in the attachment of 2-phenylpropyl groups to some of the silicon atoms having hydrogen attached thereto. The catalyst is generally used in an amount to provide from $1 \times 10^{-3}$ to $1 \times 10^{-7}$ gram atoms of Pt per mol of the α-methylstyrene, although larger amounts do no harm. The reaction occurs slowly at room temperatures in some cases, but for practical rates, the reaction is ordinarily carried out at from 70° to 175° C. This addition reaction is rather unique in that it produces only the 2-phenyl-propyl-substituted compounds.

After the first reaction has been completed, a reaction is then effected between either ethylene and/or propylene and the remaining silicon-bonded hydrogen atoms in the copolymer. Sufficient ethylene and/or propylene is used to provide at least one double bond for each remaining SiH. Preferably an excess of ethylene and/or propylene is used so that the SiH content of the copolymer is reduced to a very small value. This SiH addition reaction to carbon-carbon double bonds is also best carried out in the presence of chloroplatinic acid in an amount of from 1 to $10^{-3}$ to $1 \times 10^{-7}$ gram atoms of Pt per mol of ethylene and/or propylene. This reaction also occurs slowly at room temperatures in some cases, but for practical rates, the reaction is ordinarily carried out at from 75° to 200° C.

An alternative method for preparing the 2-phenylpropylmethylsiloxane-containing copolymers is to first effect a reaction between methylhydrogensiloxane and a sufficient quantity of α-methylstyrene so that substantially all of the silicon-bonded hydrogen atoms add to carbon-carbon double bonds. The 2-phenylpropylmethylsiloxane can then be copolymerized by conventional techniques with an ethylmethylsiloxane and/or propylmethylsiloxane. The 2-phenylpropylmethylsiloxane can also be prepared by hydrolyzing a silane of the formula

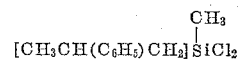

The latter is prepared by reacting α-methylstyrene with CH$_3$HSiCl$_2$ in the presence of chloroplatinic acid as a catalyst.

The 2-phenylpropylmethylsiloxane copolymers can also be prepared by cohydrolyzing a silane of the formula

Conventional organosilane hydrolysis techniques can be used.

The copolymers wherein R is an ethylene or propylene radical can be produced by first reacting styrene or allylbenzene with methyldichlorosilane. This reaction is best effected in the presence of a platinum-type catalyst. Generally, such additions result in a mixture of various isomers. However, this does not impair the properties of the mold release agent made from such a mixture of isomers. The β-phenylethylmethylchlorosilane can be obtained in high yields by using a highly polar solvent such as tetrahydrofuran. This process is described in detail in U.S. Patent No. 2,954,390 (Pike et al.). However, it should be pointed out that mixtures of alpha and beta adducts can be used.

The silane obtained by the SiH addition reaction can then be cohydrolyzed and condensed with ethylmethyldichlorosilane and/or propylmethyldichlorosilane. Conventional cohydrolysis procedure can be used. Catalysts, such as acids or bases, are usually used to effect this cohydrolysis.

The copolymer containing

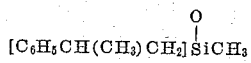

and methylethylsiloxane units is preferred as a release agent because of the very economical method used to make this copolymer. This copolymer also possesses the best combination of paintability and release properties. Although good results are obtained with the 10 to 90 mol percent range of

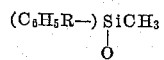

units, the best results are obtained with from 15 to 60 mol percent of these units and from 40 to 85 mol percent of the

units.

The mold release agents of this invention can be used as release agents for various materials, such as rubber and plastics. However, these mold release agents are especially valuable in releasing rubber, especially synthetic rubbers such as GRS and buna.

These mold release agents are not only excellent release agents, but have the added advantage of not producing "fisheyes" when paint is applied over the release agents. Not only can parts in proximity to the molded parts be painted without producing "fisheyes," but the molded part itself can also be painted. These release agents have good heat stability and can be used to release materials molded at high temperatures. The lubricity of the release agents increases the abrasion resistance of molded rubber parts. These release agents also reduce the tendency of rubber parts to squeak when subjected to force.

If desired, certain additives, such as rust inhibitors, can be added to the mold release agent.

The following examples are illustrative only and should not be construed as limiting the invention which is properly delineated in the appended claims.

Example 1

A mixture of 600 g. (10 mols) of a trimethylsilyl endblocked methylhydrogensiloxane, 236 g. (2 mols) of α-methylstyrene and 1 ml. of 0.06 M chloroplatinic acid solution in amyl acetate was heated to a temperature of 160° C. in a bomb. Propylene under a pressure of 150 p.s.i. was then pumped into the bomb. The temperature was maintained between 150° and 175° C. for several hours. The product was then removed and filtered. The product is a copolymer of about 80 mol percent propylmethylsiloxane units and 20 mol percent

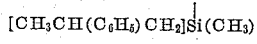

units.

Example 2

A mixture of 480 g. (8 mols) of a trimethylsilyl endblocked methylhydrogensiloxane, 125 ml. of α-methylstyrene and 0.8 ml. of 0.1 M chloroplatinic acid in isopropanol were heated to 70° C., at which time heating was discontinued. The temperature then rose to 100° C. The remaining α-methylstyrene (making a total of 566 g., 4.8 mols) was then added while the temperature was maintained at from 100° to 200° C. for 1½ hours. The reaction mass was then added with 300 ml. of toluene to a bomb. The bomb was maintained at 100° C. while ethylene was pumped in under pressure. After the reaction was complete the product was removed and filtered. The product is a copolymer of about 60 mol percent

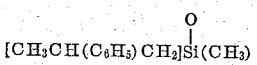

and 40 mol percent methylethylsiloxane units.

Example 3

A mixture of 600 g. (10 mols) of a trimethylsilyl endblocked methylhydrogensiloxane, 472 g. (4 mols) of α-methylstyrene and 1 ml. of 0.06 M chloroplatinic acid solution in amyl acetate was heated to a temperature of 170° C. in a bomb. The bomb was then cooled to 100° C. and an additional 472 g. (4 mols) of α-methylstyrene was added. The temperature again rose to 170° C. Ethylene was then pumped into the bomb at a pressure of 60 p.s.i. until the reaction was complete. The product was then removed and filtered. The product is a copolymer of about 20 mol per cent ethylmethylsiloxane and 80 mol per cent

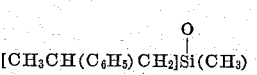

units.

Example 4

A mixture of 600 g. (10 mols) of a trimethylsilyl endblocked methylhydrogen siloxane, 125 ml. of α-methylstyrene and 1.0 ml of 0.1 M chloroplatinic acid in isopropanol was heated to a temperature of 70° C. The remaining α-methylstyrene was then added (making a total of 354 g., 3 mols). The reaction mass was maintained at 100° C. for 2 hours. The reaction mass was added to 200 ml. of toluene in a bomb.

Ethylene was then pumped into the bomb while a temperature of from 80° C. to 103° C. was maintained. After the reaction was complete, the crude product was filtered and the toluene removed. The product is a copolymer of 30 mol percent

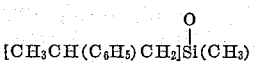

and 70 mol percent methylethylsiloxane units.

Example 5

A mixture of 600 g. (10 mols) of a trimethylsilyl endblocked methylhydrogensiloxane, 125 ml. of α-methyl styrene and 1.0 ml. of 0.1 M chloroplatinic acid in isopropanol was heated to a temperature of 70° C. The remaining α-methylstyrene was then added (making a total of 590 g., 5 mols). The reaction mass was maintained at from 100° to 110° C. for 2 hours. The product was diluted with 300 ml. of toluene and placed into a bomb. Ethylene was then pumped into the bomb for several hours. A temperature of from 90° to 100° C. was maintained during this time. The product was removed from the bomb, filtered and the toluene removed. A copolymer of 50 mol percent

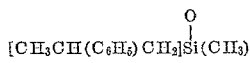

units and 50 mol percent ethylmethylsiloxane units was obtained.

Example 6

A mixture of 780 g. (13 mols) of a trimethylsilyl endblocked methylhydrogensiloxane, 125 ml. of α-trimethylstyrene and 0.1 M chloroplatinic acid in isopropanol was heated to a temperature of 70° C. The remaining α-methylstyrene wah then added making a total of 306.8 g., (2.6 mols). The reaction mass was maintained at from 100° to 105° C. for one hour. The reaction mass and 300 ml. of toluene were placed in a bomb. Ethylene was then pumped into the bomb for several hours during which time a temperature of from 90° to 127° C. was maintained. The product was removed from the bomb, filtered and the toluene removed. A copolymer of 20 mol percent

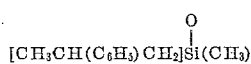

units and 80 mol percent methylethylsiloxane units was obtained.

Example 7

The copolymers prepared in the preceding examples were compared in respect to release properties and "paintability" with conventional silicone release agents and also with a copolymer of 20 mol percent

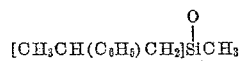

units and 80 mol percent dimethylsiloxane units. All of the copolymers prepared in the preceding examples were comparable to conventional silicone release agents and the dimethylsiloxane copolymer in releasing rubber from a mold. The "paintability" of these materials was determined by spreading one drop of the material on an aluminum panel and then spray painting the aluminum panel. The panels on which conventional release agents and the dimethylsiloxane copolymer had been spread, developed numerous "fisheyes" upon painting. The quality of the paint on these panels was quite poor. The panels on which the copolymers prepared in the preceding examples had been spread, developed few, if any, "fisheyes." The quality of paint on these panels was quite good and was comparable to that of uncontaminated panels.

Example 8

When the following silanes are cohydrolyzed at an equimolar ratio with ethylmethyldichlorosilane, the following copolymers are obtained. These copolymers have good release and "paintability" properties.

| Silane | Mol percent | Copolymeric Unit |
|---|---|---|
| 1. $(C_6H_5CH_2CH_2)\overset{CH_3}{\underset{\mid}{Si}}Cl_2$ | 50 | $(C_6H_5CH_2CH_2)\overset{O}{\underset{\mid}{Si}}CH_3$ |
| | 50 | and $(CH_3)(C_2H_5)SiO$ |
| 2. $(C_6H_5CH_2CH_2CH_2)\overset{CH_3}{\underset{\mid}{Si}}Cl_2$ | 50 | $(C_6H_5CH_2CH_2CH_2)\overset{O}{\underset{\mid}{Si}}CH_3$ |
| | 50 | and $(CH_3)(C_2H_5)SiO$ |
| 3. $(C_6H_5\overset{CH_3}{\underset{\mid}{CH}}-)\overset{CH_3}{\underset{\mid}{Si}}Cl_2$ | 50 | $(C_6H_5\overset{CH_3}{\underset{\mid}{CH}}-)\overset{CH_3}{\underset{\mid}{Si}}O$ |
| | 50 | and $(CH_3)(C_2H_5)SiO$ |

That which is claimed is:

1. A composition of matter consisting essentially of a toluene soluble copolymer of (1) from 10 to 90 mol percent polymeric units of the formula $(C_6H_5R-)(CH_3)SiO$, wherein R is an alkylene radical of from 2 to 3 inclusive carbon atoms and (2) from 10 to 90 mol percent polymeric units of the formula $$CH_3\overset{R'}{\underset{\mid}{Si}}O$$

wherein R' is an alkyl radical of from 2 to 3 inclusive carbon atoms.

2. The composition of claim 1 wherein R is an ethylene radical and R' is ethyl.

3. The composition of claim 1 wherein R is a propylene radical and R' is ethyl.

4. A composition of matter consisting essentially of a toluene soluble copolymer of (1) polymeric units of the formula $$(C_6H_5\overset{CH_3}{\underset{\mid}{CH}}CH_2)(CH_3)SiO$$

and (2) the polymeric units of the formula $$CH_3\overset{C_2H_5}{\underset{\mid}{Si}}O$$

wherein (1) is present in an amount of from 10 to 90 mol percent, and (2) is present in amount of from 10 to 90 mol percent.

5. The composition of claim 4 wherein (1) is present in an amount from 15 to 60 mol percent, and (2) in an amount from 40 to 85 mol percent.

References Cited by the Examiner
UNITED STATES PATENTS 2,970,150    1/61    Bailey            260—448.2
3,088,964    5/63    Ryan            260—46.5

OTHER REFERENCES

Rochow: Chemistry of the Silicones, 2nd edition, Wiley, 1951, p. 142.

MURRAY TILLMAN, *Primary Examiner.*
LOUISE P. QUAST, *Examiner.*

UNITED STATES PATENT OFFICE
CERTIFICATE OF CORRECTION

Patent No. 3,186,964                  June 1, 1965

Gust J. Kookootsedes et al.

It is hereby certified that error appears in the above numbered patent requiring correction and that the said Letters Patent should read as corrected below.

Column 2, lines 17 and 18, the formula should appear as shown below instead of as in the patent:

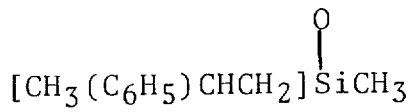

$$[CH_3(C_6H_5)CHCH_2]\overset{\overset{\displaystyle O}{\|}}{Si}CH_3$$

column 5, lines 12 and 13, for "α-trimethylstyrene" read -- α-methylstyrene --.

Signed and sealed this 22nd day of February 1966.

(SEAL)
Attest:

ERNEST W. SWIDER                  EDWARD J. BRENNER
Attesting Officer                   Commissioner of Patents